Oct. 26, 1948.    H. B. WILLARD    2,452,172
METHOD FOR CATALYTIC CRACKING OF HYDROCARBON OILS
Filed Oct. 17, 1945    3 Sheets-Sheet 2
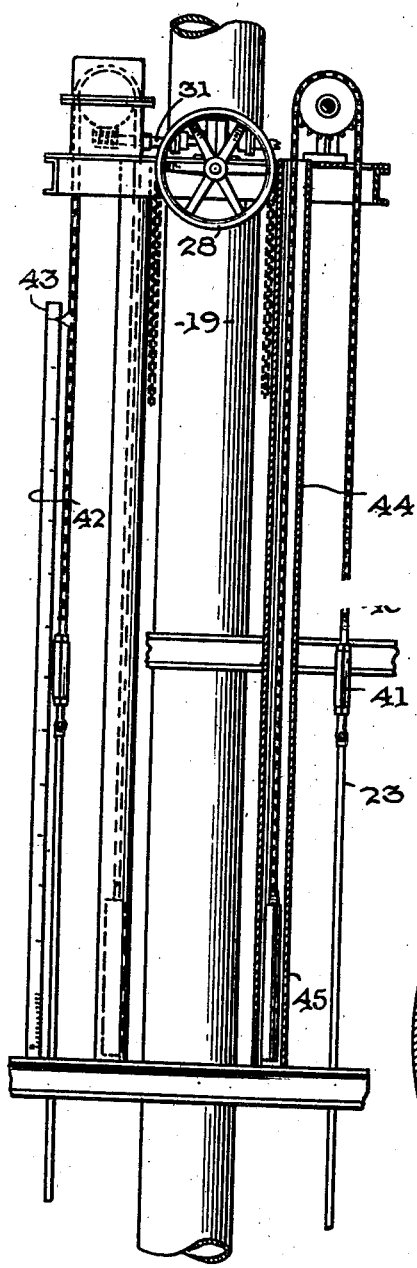
INVENTOR.
HERBERT B. WILLARD
BY
HIS ATTORNEY

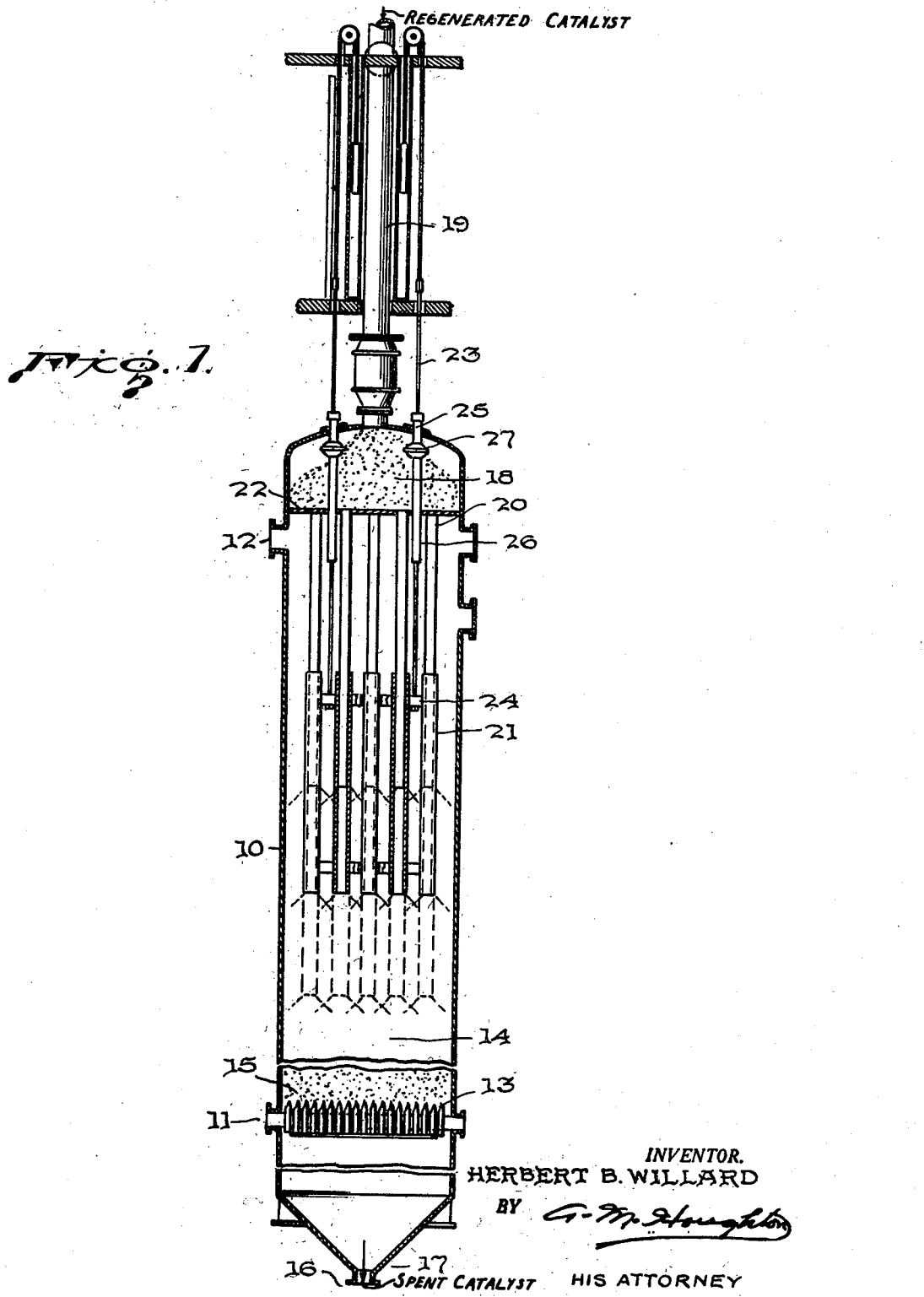

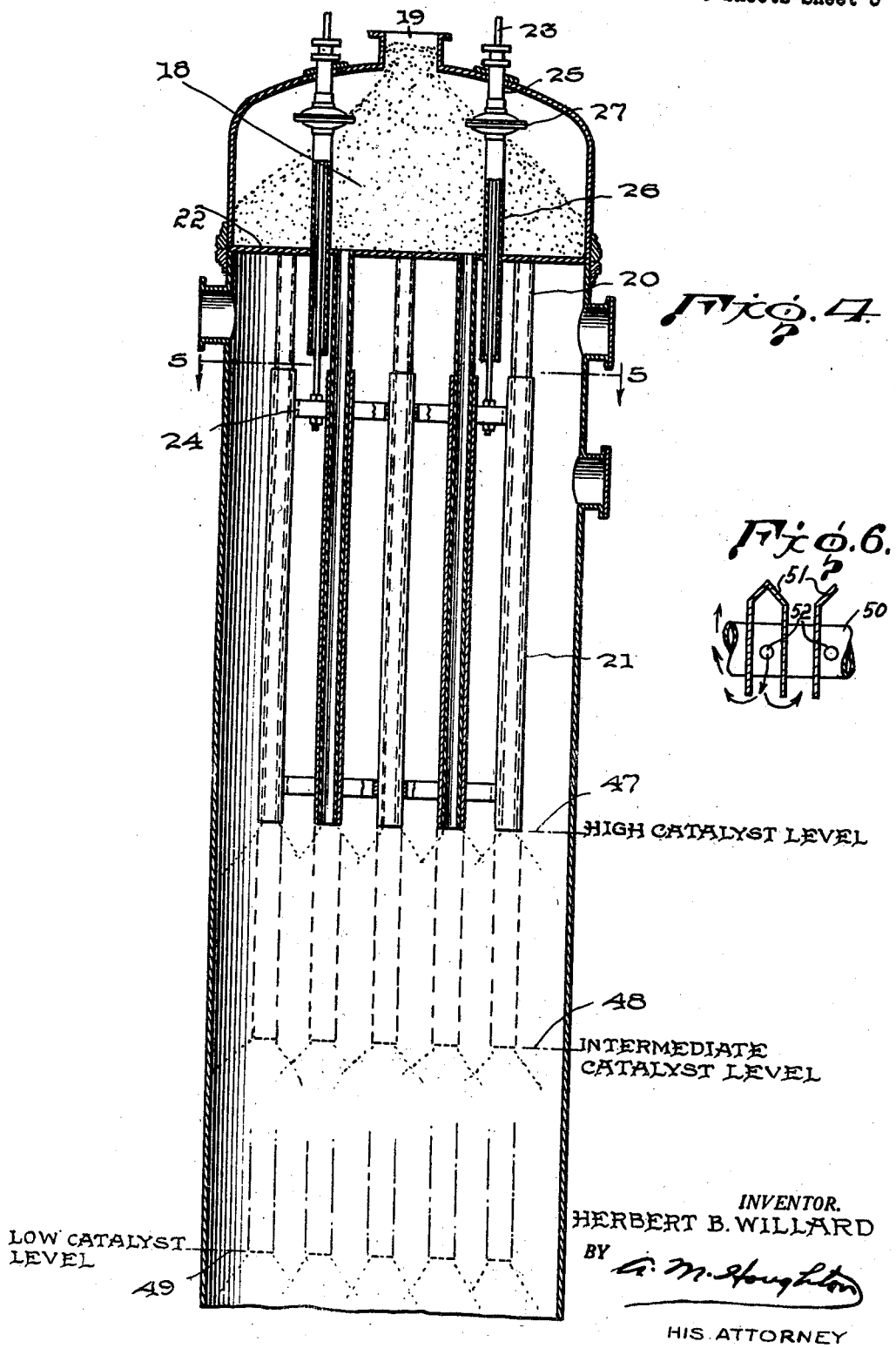

Patented Oct. 26, 1948

2,452,172

UNITED STATES PATENT OFFICE 2,452,172

METHOD FOR CATALYTIC CRACKING OF HYDROCARBON OILS

Herbert B. Willard, Port Arthur, Tex., assignor to Gulf Oil Corporation, Pittsburgh, Pa., a corporation of Pennsylvania Application October 17, 1945, Serial No. 622,812

4 Claims. (Cl. 196—52)

This invention relates to an improved method for subjecting hydrocarbons to the action of solid catalytic materials, and more particularly to an improved method for effecting cracking of hydrocarbon oils at high temperatures in the presence of solid catalysts.

It is common to promote pyrolysis or cracking of hydrocarbons by subjecting them, at elevated temperatures, to contact with solid catalysts. In most cases such contact results in the formation of products of reaction, such as carbon, which deposit on the catalyst and reduce its activity, so that it must be regenerated in order to restore its activity.

In one system of catalytic cracking the catalyst is maintained in fixed beds lying in a series of reactors, semicontinuous operation being achieved by passing hydrocarbon vapors through one of the reactors while the remaining reactors are being regenerated, and periodically transferring the flow of hydrocarbon vapors from one reactor to another.

In another system, known as the "Thermofor" or "TCC" process, continuity of operation is attained by maintaining a "moving bed" of solid catalyst in the reaction zone lying in the path of the hydrocarbons, with provisions for continuously introducing catalyst to the upper part of the bed, for removing spent catalyst from the bottom of the bed, for conveying the spent catalyst to a regenerator and for returning regenerated catalyst to the upper part of the bed lying within the reaction zone. In prior operations of this character it has been necessary as a practical matter to maintain the bed at a constant volume, thereby providing a "space velocity" which must be determined either in the light of the initial degree of activity of the fresh catalyst or in the light of a somewhat reduced activity representing an average of the activity of the catalyst in the cycle. "Space velocity" is defined as the cold volume of oil per hour passing through the reaction zone divided by the volume of the catalyst in the reaction zone, and commonly serves as a measure of reaction time.

However, regeneration is never complete in practice. As the catalyst remains in the unit, passing repeatedly through the reaction and regeneration zones, the activity of the catalyst in the system is gradually reduced, until finally a point is reached where it is necessary to discard all or a portion of the catalyst and replace it with fresh catalyst. While it is possible to maintain a uniform space velocity over extended periods, without changing the hydrocarbon throughput of the unit, it has been impossible to achieve uniform results over extended operating periods without reducing the hydrocarbon throughput as the activity of the regenerated catalyst diminishes in efficiency.

An object achieved by the present invention is the provision of a method whereby greater uniformity of operating results can be maintained over extended periods, in a method of the character indicated, than has been true in prior operations.

A further object achieved by the present invention is the provision of a method for securing uniformity of operating conditions in a simple, effective and inexpensive manner.

My invention has for further objects such additional improvements in operating results as may hereinafter be found to obtain.

In accordance with my invention, I provide a reaction zone adapted to receive and maintain a bed of solid catalyst lying in the path of the hydrocarbon vapors to be treated or cracked, with means for introducing fresh or regenerated catalyst to the upper portion of the bed and for removing it from the bottom of the bed, and I provide for increasing the depth or volume of the catalyst bed as the activity of the regenerated catalyst falls, without interrupting the flow of hydrocarbons through the conversion zone.

While, in theory, it would be desirable to provide for continuously increasing the volume of the catalyst bed, I have found that in practice the rate at which the activity of the catalyst diminishes in efficiency is usually slow, and that substantial uniformity of operation can be obtained by increasing the volume or depth of the catalyst bed at more or less regular intervals in increments depending upon the diminution in activity of the catalyst.

Thus, in a specific embodiment of an apparatus for carrying out the method of my invention, a supply of fresh or regenerated catalyst is maintained in a zone or hopper lying above the reaction zone and preferably forming a part of the reaction vessel. Catalyst is permitted to flow downward from this hopper into the reaction chamber or zone through a series of downflow conduits adjustable in length, with provision for raising and lowering the lower ends of the downflow conduits to establish a desired level of catalyst bed lying in the path of the hydrocarbons in the reaction chamber.

In a simple and preferred form, the downflow conduits comprise a plurality of fixed downflow pipes with extension sleeves mounted thereon, the sleeves being supported as a unit from a frame which can be raised or lowered and fixed in any desired position from outside the vessel. Such a structure makes it possible to vary the depth and volume of the catalyst bed over a fairly wide range, without interrupting the flow of hydrocarbons and the course of the reaction or conversion taking place.

In accordance with my invention, the operation is commenced with the catalyst downflow conduits in their extended positions, the lower ends of these conduits establishing a minimum catalyst bed volume adapted to give the optimum space velocity in terms of fresh catalyst, namely, a catalyst of maximum activity. As the operation proceeds and the activity of the catalyst gradually diminishes in efficiency, the downflow pipes are periodically shortened, thus increasing the depth of the bed in proportion to the loss in catalytic activity, until finally the conduits are shortened as far as possible and the catalyst bed reaches the maximum volume permitted by the structural limitations.

By properly proportioning the downflow conduits and the extension sleeves mounted thereon, it is possible to provide for increasing the volume of the catalyst bed to a point where substantial uniformity of operation can be obtained up to a point where the activity of the catalyst approaches the minimum activity consistent with efficient operation. In short, in the preferred design, the maximum volume of the catalyst bed permitted by the construction should give the desired space velocity when the catalyst approaches such a low level of activity that further enlargement of the bed volume would be undesirable. When such maximum volume has been reached, it would ordinarily then be desirable to remove the catalyst from the system and replace it in whole or in part with fresh catalyst of maximum activity.

It is ordinarily desirable to select a depth of catalyst as low as possible for the quantity of charge available and desired yield. A highly satisfactory cycle from all points of view can be worked out with a catalyst bed or path or flow of the order of two to four feet. The catalyst bed can be increased from, say, a low of two feet to a high of twenty-eight feet or more. At such time, after the catalyst has diminished in activity to a point where its further use would be uneconomical, the operation is then interrupted, fresh catalyst supplied to the system, and the operation is again renewed with the bed at minimum volume as before.

Proper velocity of the reactant material through the contact mass is important in effecting a high yield of the desired products and in minimizing side and secondary reactions. Thus by varying the space velocity in the reaction zone without interrupting the flow of hydrocarbons, I obtain a higher and more uniform yield of the desired products throughout the entire cracking operations.

In order that my invention may be fully understood, I now describe, with reference to the drawing accompanying and forming part of this specification, a preferred embodiment of an apparatus for carrying out the method of my invention. In these drawings, Figure 1 is a vertical cross sectional view of an apparatus for carrying out the invention, Figure 2 is a detailed view of the operating mechanism, Figure 3 is a top plan view, Figure 4 is a detailed vertical cross section of the reaction chamber, wherein the tubes are in a different position than in Figure 1, Figure 5 is a transverse cross section taken on line 5—5 of Figure 4, Figure 6 is a detail view partly in section of one of the elements shown in Figure 1.

Referring to Figure 1, there is shown a catalyst vessel 10 of the vertical type provided with a valved inlet 11 for the reacting hydrocarbon materials and a valved outlet 12 for the reacted materials. A grate or a perforated plate 13 or other suitable support is disposed in the reaction chamber 14 for supporting a catalyst bed 15. As shown in greater detail in Figure 6, the grate 13 is constructed of a transverse duct 50 extending from wall to wall within the reactor and terminating externally of the reactor upon either side thereof. Mounted transversely on the duct 50, are a series of inverted troughs 51 extending from wall to wall within the reactor in a direction normal to the duct 50. Each of the troughs has the form of a gable roofed channel open at the bottom as shown in Figure 6. In the duct 50, below each trough 51, there is an orifice 52. The reactant hydrocarbons enter inlet 11 of the duct 50, flow out through the orifices 52, into the space under troughs 51 and then flow upwardly into the catalyst bed 15.

The reaction chamber 14 is adapted to receive catalytic material of any solid pulverulent type such as natural or artificial clays or gels, silica or alumina impregnated with metallic oxides or salts, or the like. The catalytic material is withdrawn from the reaction chamber 14 through the grate 13 and an outlet conduit 16 controlled by a slide valve 17.

The catalyst may be introduced into the distributing hopper 18 of the reacting chamber 14 through the catalyst inlet tube 19 from a hopper (not shown) above the catalyst tower 10 which is preferably closed to the atmosphere to prevent the escape of gases. From the distributing hopper 18 of the reaction chamber 14 the catalyst drops by gravity through catalyst feed pipes 20 and telescopically extensible feed pipes 21 into the reaction chamber 14. The top of the catalyst bed 15 will not rise above the bottom of the extensible pipes 21 feeding the catalyst to this bed.

Downflow catalyst feed pipes 20 are attached to partition 22 at the top of the reaction chamber 14 and a plurality of movable pipe sleeves 21 are telescopically mounted on catalyst feed pipes 20. The end of each rod 23 is attached to the frame 24 to which are also attached the telescoping pipe sleeves 21. Each rod 23 passes through a stuffing box 25 and a sleeve 26, which is attached to partition 22 at the top of the reaction chamber 14 and is provided with an expansion joint 27.

Figures 2 and 3 show the mechanism wherein a chain operated handwheel 28 keyed on a shaft 29 operates through a worm drive 30, shaft 31, worm drives 32 and 33, and drive shafts 34 and 35, to turn roller chain sprockets 36, 37, 38 and 39. Sprockets 36, 37 are rotated in direction opposite to that of sprockets 38 and 39. A roller chain 40 passes over and is moved by each of the sprockets 36, 37, 38 and 39. A counterweight 45 is fastened at one end of each roller chain 40 and moves up and down in pipe 44. Each chain 40 is connected to a rod 23 by a turnbuckle 41 for length adjustment. The level of the catalyst in the reaction chamber 14 is indicated on scale 42 by a pointer 43 fastened to a roller chain 40. The weight of rod 23, support 24 and sleeves 21 are thus balanced by the counter-weights and the system made easily movable by rotation of the wheel 28 in any suitable manner.

Mechanism for lowering and raising pipe sleeves 21 is connected with operating platform 46 which is outside the reaction chamber 14.

Figure 4 illustrates the variation in level of the catalyst bed, the high level 47, an intermediate level 48 and the low level 49 being diagrammatically indicated in the reaction chamber.

Figure 5 is a transverse cross section to show the arrangement of the catalyst feed pipes 21 in the reaction chamber shown in Figure 4.

In employing the apparatus illustrated for the catalytic cracking of hydrocarbons, a catalyst is passed continuously through the reaction chamber 14 and a definite level of catalyst bed 15 is established therein from, say, about 2 to 4 feet deep. The catalyst is poured into the inlet tube 19 and gravitates to the hopper 18. From this hopper 18 it gravitates into the downflow feed pipes 20 and extensible telescopic pipe sleeves 21 which extend into the reaction chamber 14.

The top of the catalyst bed 15 in the reaction chamber 14 is maintained substantially at the bottom of the extensible catalyst feed pipes 21 feeding the catalyst to this bed. The spent catalyst is continuously withdrawn through outlet conduit 16. This spent catalyst is then regenerated and returned to the reaction chamber 14 and the above cycle is repeated.

As the activity of the catalyst bed 15 diminishes, the catalyst bed 15 is progressively increased in height and maintained at this level until the activity of said catalyst bed 15 undergoes further diminution. This process of increasing the catalyst bed 15 in reaction chamber 14 continues until the maximum catalyst level 47 is reached. Cracking is then continued until the activity of the catalyst 47 has diminished in efficiency to a point where further operation would be inefficient. At that time cracking is discontinued, the spent catalyst is discharged and new fresh active catalyst charged into the system.

The variation of the catalyst bed level 15 is accomplished without interrupting the cracking operation, thereby a rapid, uniform rate of cracking may be maintained without substantially increasing the cracking temperature and thus eliminating reaction products different from those derived.

While the invention has been herein disclosed in what are now considered to be the preferred forms, it is to be understood that it covers all changes, modifications and adaptations within the scope of the appended claims.

What I claim is:

1. In a process of contacting hydrocarbons with solid catalytic material by continuously passing a stream of hydrocarbons through a moving bed of said catalyst, wherein active catalyst is continuously supplied to the top of said catalyst bed, spent catalyst is continuously withdrawn from the bottom of said catalyst bed, and the spent catalyst is regenerated and returned to the top of said catalyst bed, the improvements which comprise reducing the space velocity of the hydrocarbons through said catalyst bed by increasing the volume of the bed as the average activity of catalyst entering the catalyst bed diminishes, without interrupting the flow of hydrocarbons therethrough, while maintaining otherwise substantially uniform operating conditions throughout the process, thereby obtaining a substantially uniform rate of conversion and yield of products.

2. In a process of contacting hydrocarbons with solid catalytic material by continuously passing a stream of hydrocarbon vapors through a moving bed of said catalyst, wherein active catalyst is continuously supplied to the top of said catalyst bed, spent catalyst is continuously withdrawn from the bottom of said catalyst bed, and the spent catalyst is regenerated and returned to the top of said catalyst bed, the improvements which comprise initially establishing a minimum volume of catalyst bed which will give an optimum hydrocarbon space velocity for catalyst of maximum activity, thereafter reducing the space velocity in proportion to the progressively diminishing average activity of catalyst entering the catalyst bed by progressively increasing the volume of the bed, thereby obtaining optimum space velocities for catalyst of diminishing activity without interrupting the flow of hydrocarbon therethrough, while maintaining otherwise substantially uniform operating conditions throughout the process, thereby obtaining a substantially uniform rate of conversion and yield of products.

3. A continuous method for catalytically cracking petroleum hydrocarbons which comprises continuously passing hydrocarbon vapors upwardly through a reaction chamber containing a bed of solid catalyst, continuously withdrawing the vapor of the cracked hydrocarbons from the reaction chamber above the level of the catalyst bed, continuously withdrawing spent catalyst from the lower end of the catalyst bed, regenerating said spent catalyst, continuously adding said regenerated catalyst to the top of the catalyst bed, and gradually increasing the depth of the catalyst bed without interrupting the flow of the hydrocarbon vapor therethrough in proportion to the gradually diminishing activity of said regenerated catalyst so that the decreased activity of the catalyst will be offset by the increased amount of the catalyst which the incoming hydrocarbon vapors are forced to contact.

4. A continuous method for catalytically cracking petroleum hydrocarbons which comprises establishing a minium solid catalyst bed in the reaction chamber which will give an optimum hydrocarbon space velocity for a catalyst of maximum activity, continuously passing hydrocarbon vapors upwardly through the said bed of catalyst, continuously withdrawing the vapor of the cracked hydrocarbons from the reaction chamber above the level of the catalyst bed, continuously withdrawing spent catalyst from the lower end of the catalyst bed, regenerating said spent catalyst, continuously adding said regenerated catalyst to the top of the catalyst bed, and gradually increasing the volume of the catalyst bed without interrupting the flow of the hydrocarbon vapors therethrough in proportion to the gradually diminishing activity of said regenerated catalyst so that the decreased activity of the catalyst will be offset by the increased amount of the catalyst which the incoming hydrocarbon vapors are forced to contact.

HERBERT B. WILLARD.

REFERENCES CITED

The following references are of record in the file of this patent:

UNITED STATES PATENTS

| Number | Name | Date |
| --- | --- | --- |
| 669,411 | Guiterman | Mar. 5, 1901 |
| 2,298,593 | Rubin et al. | Oct. 13, 1942 |
| 2,339,874 | Nysewander | Jan. 25, 1944 |
| 2,344,449 | Ogorzaly | Mar. 14, 1944 |
| 2,353,505 | Scheineman | July 11, 1944 |
| 2,386,846 | Dunham | Oct. 16, 1945 |
| 2,446,986 | Simpson | Aug. 10, 1948 |

FOREIGN PATENTS

| Number | Country | Date |
| --- | --- | --- |
| 456,637 | Great Britain | Nov. 12, 1936 |